United States Patent [19]
Church

[11] Patent Number: 5,460,036
[45] Date of Patent: Oct. 24, 1995

[54] TIRE INSPECTION APPARATUS

[76] Inventor: Clyde M. Church, 1325 E. Wesleyan Dr., Tempe, Ariz. 85282

[21] Appl. No.: 339,348

[22] Filed: Nov. 14, 1994

Related U.S. Application Data

[63] Continuation-in-part of Ser. No. 188,715, Jan. 28, 1994, abandoned.

[51] Int. Cl.$^6$ ............................................. G01M 17/00
[52] U.S. Cl. ............................................. 73/146; 254/50.3
[58] Field of Search ................. 254/50.1, 50.2–50.3, 254/50.4; 73/146

[56] References Cited

U.S. PATENT DOCUMENTS

| | | | |
|---|---|---|---|
| 1,853,146 | 4/1932 | Printice et al. | 254/50.2 |
| 2,028,440 | 1/1936 | Dalrymple | 254/50.4 |
| 2,043,169 | 6/1936 | Hawkinson | 254/50.2 |
| 2,353,570 | 7/1944 | Kraft | 254/50.4 |
| 2,477,858 | 8/1949 | Brabbin | 254/50.3 |
| 2,496,389 | 2/1950 | Goodman | 254/50.3 |
| 2,589,771 | 3/1952 | Campbell et al. | |
| 2,919,105 | 12/1959 | Kaenan | 254/50.3 |
| 3,005,619 | 10/1961 | Bowen | 254/50.3 |
| 3,790,134 | 2/1974 | Mattenzzi | 254/50.2 |
| 4,169,373 | 10/1979 | Clark et al. | 73/146 |
| 5,165,273 | 11/1992 | Church | 73/146 |

Primary Examiner—Richard Chilcot
Assistant Examiner—Ronald L. Biegel
Attorney, Agent, or Firm—Cahill, Sutton & Thomas

[57] ABSTRACT

A tire support structure with mechanisms for rotating and spreading a tire is mounted for rotation atop a stationary pedestal. A mechanism under control of an operator/inspector standing at a work station alternatively prevents and permits the support structure to rotate. The work station also contains controls for the tire rotating and the tire spreading mechanisms. Primary and secondary lighting arrangements illuminate the tire being inspected.

7 Claims, 2 Drawing Sheets

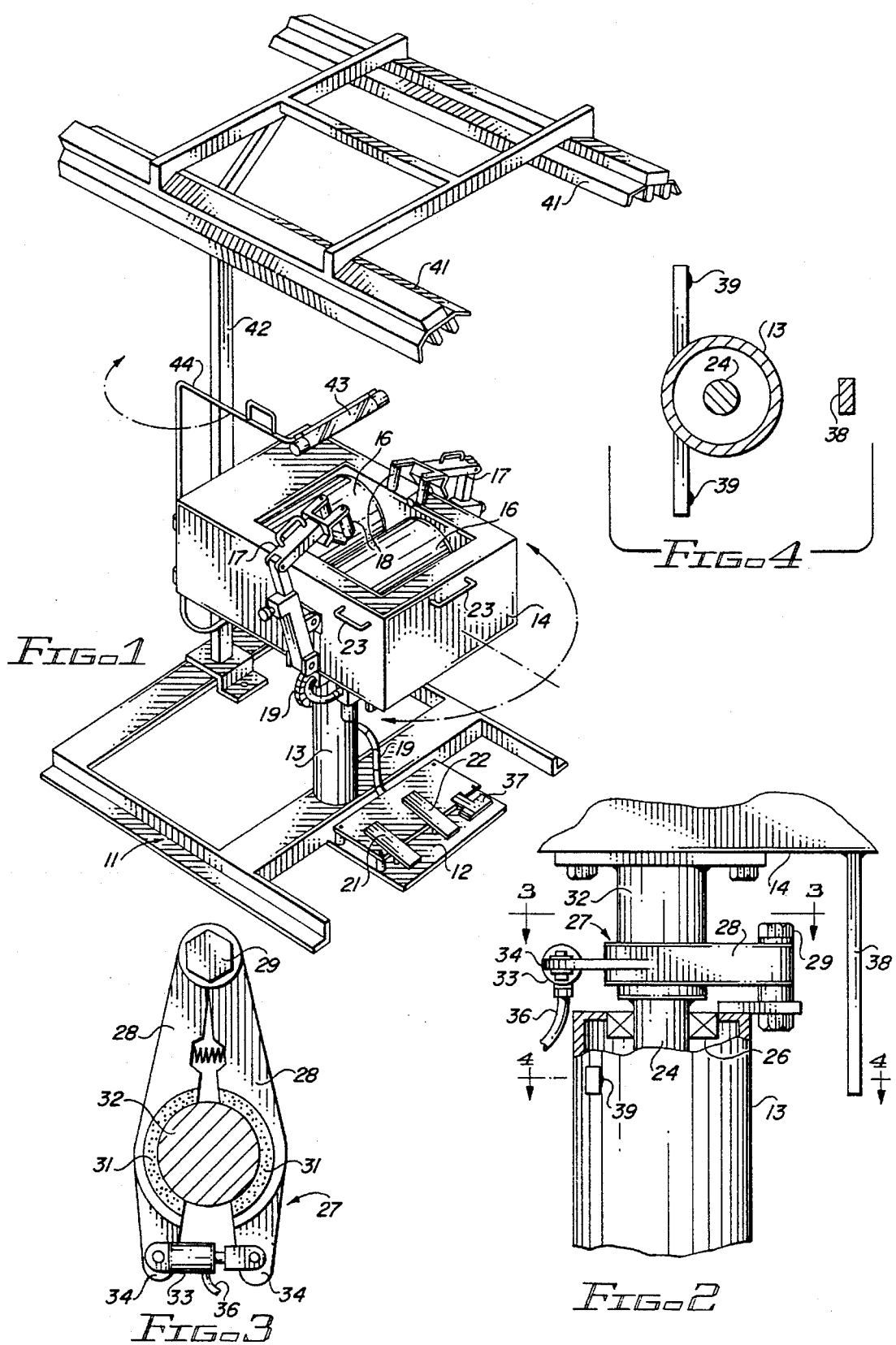

TIRE INSPECTION APPARATUS

This application is a continuation-in-part of application Ser. No. 08/188,715, filed Jan. 28, 1994.

TECHNICAL FIELD

This invention is concerned with facilitating the inspection of the interior of a tire casing.

BACKGROUND ART

It is customary for tire manufacturers to inspect both the exterior and interior surfaces of new motor vehicle tires for possible defects before releasing the tires from the manufacturing facility. And, a thorough inspection of the interior of a tire is performed prior to retreading a worn tire.

Numerous machines have been devised for facilitating these inspections. Such machines have usually been capable of supporting a tire in an upright position, spreading opposed bead regions of the tire to expose its interior, and rotating the tire to progressively expose the entire interior of the carcass for inspection.

My prior U.S. Pat. No. 5,165,273, granted Nov. 24, 1992, "TIRE INSPECTION APPARATUS" discloses a machine which greatly facilitates inspection of heavy truck tires. That apparatus had provisions for rolling a tire into place on a support structure while that structure was in a lowered position and then elevating the support structure to a more comfortable inspecting position for the operator. The Background Art section of that patent discloses several earlier tire inspection machines, and that section is incorporated herein by reference.

Many prior inspection machines, including the machine disclosed in my prior patent, require the operator/inspector to move around the machine to insure thorough inspection of the tire. This can be time-consuming for the operator/inspector.

U.S. Pat. No. 2,589,771, granted Mar. 18, 1952, to R. E. Campell, et al. for a "TIRE SPREADER" discloses a machine in which the tire support and spreading mechanism is rotatably mounted on an upright standard. Because the tire support mechanism is freely rotatable, handling a tire thereon can be awkward.

Thorough tire inspection also requires adequate lighting. Some prior inspection apparatus, like that shown in my prior patent, have included upright standards supporting a bank of lights above the tire. Others, such as the apparatus shown in U.S. Pat. No. 1,853,146, granted Apr. 12, 1932, to W. G. Prentice, et al., for "TIRE MACHINE", included a lamp which was pivotally mounted for swinging movement into and out of the interior of the tire.

DISCLOSURE OF THE INVENTION

This invention contemplates incorporating tire bead spreading means and tire rotating means into a support structure rotatably mounted atop a pedestal in front of a work station. The apparatus further includes means operative between the support structure and the pedestal to, respectively, prevent and permit rotation of the support structure. The work station is equipped with control means, preferably foot actuated, for controlling operation of the tire bead spreading means, the tire rotating means, and the means for preventing and permitting rotation of the support structure. The operator/inspector standing at a single work station thus has control over all movements of the tire required to perform a thorough inspection.

To insure adequate illumination of a tire positioned on the support structure, the apparatus includes a primary light source stationarily mounted above the tire and a secondary light source mounted on the support structure for rotation therewith and movable into and out of the central space of the tire.

BRIEF DESCRIPTION OF THE DRAWINGS

The invention is described in greater detail hereinafter by reference to the accompanying drawings, wherein:

FIG. 1 is a perspective view of the tire inspection apparatus embodying the invention;

FIG. 2 is an enlarged fragmentary elevational view of a connection between a pedestal and a tire support structure employed in apparatus embodying the invention;

FIG. 3 is an enlarged horizontal sectional view taken as indicated by line 3—3 in FIG. 2; and FIG. 4 is a horizontal sectional view taken as indicated by line 4—4 in FIG. 2;

BEST MODES FOR CARRYING OUT THE INVENTION

Figure 5:
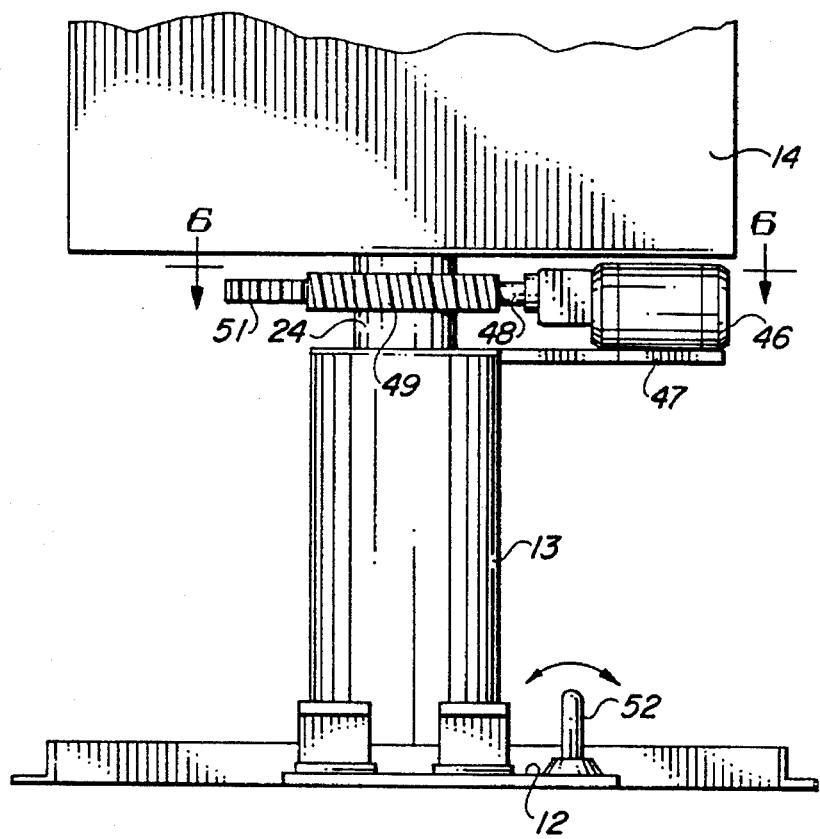
FIG. 5 is a partial elevational view of the tire inspection apparatus embodying another mode for carrying out the invention.

The several components of the tire inspection apparatus of this invention are illustrated in FIG. 1. These components include a base, indicated generally by reference numeral 11. Associated with the base 11 is an operator work station 12. An upright pedestal 13 extends upwardly from the base 11 in front of the work station 12. Mounted for limited rotation atop the pedestal 13 is a tire support structure 14.

Tire support structure 14 includes means for rotating a tire resting upright on the support structure. This rotating means preferably takes the form of a pair of horizontally disposed rollers 16 which are driven by motor means (not shown) inside the support structure.

The tire support structure 14 also includes means for spreading apart opposed bead regions of the tire being inspected. This spreading means preferably takes the form of a pair of spreader arms 17 carrying rollers 18 for engaging the tire beads. Actuation of the spreader arms is effected by motor means (not shown) inside the support structure 14.

The motor means for driving the tire rotating rollers 16 and for actuating the bead spreading arms 17 are preferably powered by compressed air supplied to them by a bundle of hoses 19 connecting the support structure and control means at the operator work station 12. These control means preferably include one foot pedal 21 for controlling the supply of air to actuate the spreader arms 17 and a second foot pedal 22 for controlling the supply of air to drive the tire rotating rollers 16. Both functions of the tire support structure are thus conveniently under control of an operator/inspector standing at the work station 12.

As mentioned previously, the tire support structure 14 is rotatable on pedestal 13 to permit a tire thereon to be inspected from different points of view with the operator/inspector remaining stationary in work station 12. Handles 23 may be provided on the sides of the support structure 14 to facilitate turning the support structure. As shown in FIG.

2, the mount for tire support structure 14 may take the form of a post 24 affixed to the bottom of the support structure and extending downwardly through a bearing 26 carried at the upper end of pedestal 13.

When a tire is undergoing an inspection sequence and the tire is rotating atop support structure 14, it is desirable to prevent the support structure from rotating on the pedestal 13. This is accomplished by a braking mechanism indicated generally by reference numeral 27 and illustrated in FIGS. 2 and 3. The braking mechanism is also preferably pneumatically actuated and in one form comprises a pair of levers 28 hingedly mounted at 29 on the upper end of pedestal 13. Each brake lever 28 carries a brake shoe 31 shaped to engage the outer surface of an enlarged region 32 of post 24. A pneumatic cylinder 33 connected to extensions 34 on brake levers 28, when supplied with compressed air from the hose 36, pulls brake levers 22 toward each other, causing brake shoes 31 to engage and prevent rotation of post region 32. This, of course, prevents rotation of the tire support structure 14 atop the pedestal 13.

Activation of braking mechanism 27 is under the control of the operator/inspector standing in work station 12. For this purpose, hose 36 supplying air to the braking mechanism is one of the hoses in the bundle of hoses 19 extending from the tire support structure to the work station. The air flow through hose 36 is under the control of the third foot pedal 37 at the work station. Thus, with simple foot movements, while standing in the same position, the operator/inspector can activate braking mechanism 27 to hold the tire support structure in any desired position or release the braking mechanism to permit rotation of the tire support structure.

To prevent damage to the bundle of hoses 19, it is desirable to limit rotation of the tire support structure 14 on pedestal 13 to a range of motion less than 360°. The stop bar 38 depending from support structure 14 and engageable with the abutments 39 extending outwardly from pedestal 13 (see FIGS. 2 and 4) serves to limit rotation of tire support structure 14.

This invention further provides for improved illumination of the interior of the tire being inspected by including primary and secondary light sources. The primary light source takes the form of a bank of lights 41 stationarily mounted on a post 42 extending upwardly from the base 11. This bank of lights 41 is positioned above and shines light downwardly onto the tire. The secondary light source is preferably a lamp 43 carried by a swinging bracket 44 pivotally mounted on tire support structure 14 (see FIG. 1). Lamp 43 thus moves with the support structure 14 when the latter is turned. The latter arrangement permits the operator/inspector to swing lamp 43 into and out of the space surrounded by the tire resting on the support structure.

Figure 6:
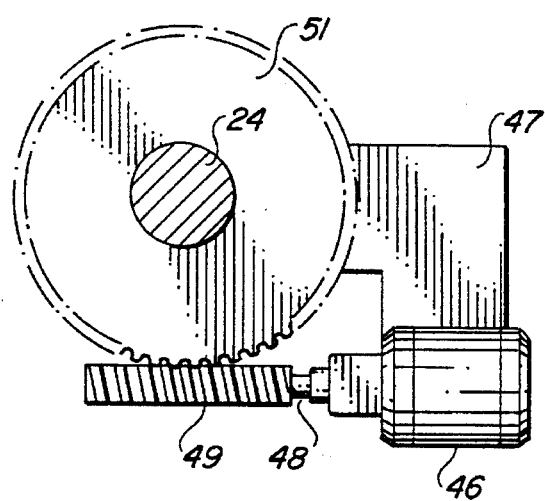
FIG. 6 is a horizontal sectional view taken as indicated by line 6—6 in FIG. 5.

Another mode for carrying out the invention is illustrated in FIGS. 5 and 6. In this embodiment, like that previously described, the tire support structure 14 is mounted for rotation about a vertical axis on a pedestal 13. Rotation of the support structure here is effected by an electric motor 46 mounted on a bracket 47 affixed to the pedestal 13.

The shaft 48 of motor 46 carries a screw-threaded worm gear 49 which meshes with a gear 51 carried by support structure post 24.

The operator/inspector standing at work station 12 energizes the motor 46 by means of a foot-actuated reversing switch 52. The operator is thus able to rotate the support structure 14 and the tire thereon to the positions best suited for inspecting the tire. When the motor 46 is de-energized, the worm gear 49 effectively brakes the support structure against rotation.

If desired, motor 46 can be pneumatically actuated under control of a reversing valve in place of switch 52.

What is claimed is:

1. Tire inspection apparatus comprising a base, said base having an operator/inspector work station operatively associated therewith, a pedestal extending upwardly from said base in front of said work station, a support structure including means for rotating a tire resting in an upright position thereon, said support structure further including means for spreading apart opposed bead regions of a tire to facilitate inspection of the tire, said support structure being mounted atop said pedestal and rotatable thereon about a vertical axis to permit a tire resting on the support structure to be inspected from different angles by an operator/inspector standing at said work station, means operative between said support structure and said pedestal for respectively preventing and permitting rotation of said support structure, and control means at said work station for controlling operation of said tire rotating means, said tire bead spreading means, and the means for preventing and permitting rotation of said support structure.

2. The tire inspection apparatus of claim 1, further characterized in that said control means is foot actuated by the operator/inspector.

3. The tire inspection apparatus of claim 1, further comprising stop means acting between said support structure and said pedestal for limiting rotation of said support means to less than 360°.

4. The tire inspection apparatus of claim 1, further comprising a primary light source mounted on said base and positioned above said support means for illuminating a tire resting on said support structure, and a secondary light source mounted on said support structure and being movable into and out of space surrounded by a tire resting on the support structure.

5. The tire inspection apparatus of claim 1, further characterized in that said tire rotating means, said tire bead spreading means, and said means for preventing and permitting rotation of said support structure are all pneumatically actuated, and air hoses are provided connecting said control means to said tire rotating means, said tire bead spreading means and said means for preventing and permitting rotation of said support structure.

6. The tire inspection apparatus of claim 5, further comprising stop means acting between said support structure and said pedestal for limiting rotation of said support means to less than 360° to prevent damage to said air hoses.

7. The tire inspection apparatus of claim 3, further comprising a primary light source mounted on said base and positioned above said support means for illuminating a tire resting on said support structure, and a secondary light source mounted on said support structure and being movable into and out of space surrounded by a tire resting on the support structure.

\* \* \* \* \*